US005642069A

United States Patent [19]
Waite

[11] Patent Number: 5,642,069
[45] Date of Patent: Jun. 24, 1997

[54] CLOCK SIGNAL LOSS DETECTION AND RECOVERY APPARATUS IN MULTIPLE CLOCK SIGNAL SYSTEM

[75] Inventor: John C. Waite, St. Paul, Minn.

[73] Assignee: Unisys Corporation, Blue Bell, Pa.

[21] Appl. No.: 233,185

[22] Filed: Apr. 26, 1994

[51] Int. Cl.6 .................................................. G06F 1/04
[52] U.S. Cl. .............................. 327/292; 327/18; 327/526; 371/61; 375/357
[58] Field of Search ............................... 327/18, 291, 292, 327/295, 99, 141, 144, 154; 371/36, 61; 375/108; 331/2, 49, 55, 56

[56] References Cited

U.S. PATENT DOCUMENTS

| 3,708,686 | 1/1973 | Butler, Jr. et al. | 331/49 |
|---|---|---|---|
| 4,135,165 | 1/1979 | Coe | 331/11 |
| 4,144,448 | 3/1979 | Pisciotta et al. | 235/301 |
| 4,185,245 | 1/1980 | Fellinger et al. | 327/292 |
| 4,239,982 | 12/1980 | Smith et al. | 327/142 |
| 4,254,492 | 3/1981 | McDermott, III | 368/119 |
| 4,542,509 | 9/1985 | Buchanan et al. | 371/61 |
| 4,644,498 | 2/1987 | Bedard et al. | 327/292 |
| 4,788,670 | 11/1988 | Hofmann et al. | 327/147 |
| 4,800,564 | 1/1989 | Defazio et al. | 371/61 |
| 4,839,855 | 6/1989 | Van Driel | 327/292 |
| 4,918,404 | 4/1990 | Vitiello et al. | 331/11 |
| 4,964,117 | 10/1990 | Shier | 375/108 |
| 4,968,951 | 11/1990 | Itaya et al. | 331/1 A |
| 4,972,442 | 11/1990 | Steierman | 375/108 |
| 5,260,979 | 11/1993 | Parker et al. | 375/108 |
| 5,301,171 | 4/1994 | Blow et al. | 327/144 |
| 5,381,416 | 1/1995 | Vartti et al. | 327/3 |
| 5,422,915 | 6/1995 | Byers et al. | 327/292 |

*Primary Examiner*—Timothy P. Callahan
*Assistant Examiner*—Kenneth B. Wells
*Attorney, Agent, or Firm*—Charles A. Johnson; Mark T. Starr

[57] ABSTRACT

A clock signal failure detection and recovery circuit for use in a system utilizing multiple, redundant clock signals. Multiple clock source circuits generate a clock signal and a periodic sync pulse, which in turn are manipulated to produce a clock signal present pulse and a periodic clock pulse. The periodic clock pulse associated with one clock signal will clock the circuitry which monitors a clock signal present pulse associated with a different clock signal. In this way, the absence of a clock signal present pulse can still be clocked into the monitoring circuitry when that particular clock signal has failed. Each clock signal present pulse is compared to at least two other clock signal present pulses, and upon recognition of a predetermined number of inconsistencies between the compared clock signal present pulses, a clock signal error signal will be issued. The error signals associated with each clock signal are monitored, and selection control signals are issued to a multiplexing circuit to select specified clock signals and periodic sync pulses depending upon the state of the selection signals. The selected clock signals and periodic sync pulses become the system clock signal, and upon failure of the clock signal which produces the system clock signal, a different clock signal and periodic sync pulse will be selected as the system clock signal.

16 Claims, 10 Drawing Sheets

| CLOCK LOSS DETECTOR INPUTS | CLOCK LOSS DETECTOR A /34 | CLOCK LOSS DETECTOR B /36 | CLOCK LOSS DETECTOR C /82 | CLOCK LOSS DETECTOR D /84 |
|---|---|---|---|---|
| INPUT-1 /68 | LONG SYNC A /66 | LONG SYNC B /70 | LONG SYNC C /74 | LONG SYNC D /78 |
| INPUT-2 /70 | SHORT SYNC B /72 | SHORT SYNC A /68 | SHORT SYNC D /80 | SHORT SYNC C /76 |
| INPUT-3 /72 | LONG SYNC B /70 | LONG SYNC A /66 | LONG SYNC D /78 | LONG SYNC C /74 |
| INPUT-4 /74 | SHORT SYNC A /68 | SHORT SYNC B /72 | SHORT SYNC C /76 | SHORT SYNC D /80 |
| INPUT-5 /76 | LONG SYNC C /74 | LONG SYNC D /78 | LONG SYNC A /66 | LONG SYNC B /70 |
| INPUT-6 /78 | CLEAR ERROR /102 | CLEAR ERROR /102 | CLEAR ERROR /102 | CLEAR ERROR /102 |
| INPUT-7 /80 | SHORT SYNC C /76 | SHORT SYNC D /80 | SHORT SYNC A /68 | SHORT SYNC B /72 |

FIG. 9

| CLOCK LOSS DETECTOR OUTPUTS | CLOCK LOSS DETECTOR A /34 | CLOCK LOSS DETECTOR B /36 | CLOCK LOSS DETECTOR C /82 | CLOCK LOSS DETECTOR D /84 |
|---|---|---|---|---|
| OUTPUT | CLOCK A FAIL /40 | CLOCK B FAIL /42 | CLOCK C FAIL /86 | CLOCK D FAIL /88 |

CLOCK SIGNAL LOSS DETECTION AND RECOVERY APPARATUS IN MULTIPLE CLOCK SIGNAL SYSTEM

BACKGROUND OF THE INVENTION

1. Field of the Invention

This invention pertains to the detection of the loss of a digital clock signal, and more particularly to the detection of the loss of an active system clock signal in a system implementing multiple clock signals by referencing the active clock signal to selected inactive clock signals, and further pertains to the ability to switch from the faulty clock signal to an operational clock signal upon detection of the loss of the faulty clock signal.

2. Description of the Prior Art

The present invention monitors for the loss of redundant clock signals. A plurality of redundant clock signal sources are used to ensure continued operation of a digital system, and the present invention monitors each of the redundant clock signals, and switches from a failed clock signal source to an operational clock signal source upon detection of the failed clock signal.

Prior art has shown the detection of two clock signals which are out of phase from one another, where one clock signal is derived from a Voltage Controlled Oscillator (VCO), and the other is a reference signal. One such arrangement is shown in U.S. Pat. No. 4,135,165, by Coe, issued Jan. 16, 1979, and detects when the phase difference between the two signals has deviated by a maximum predetermined amount, and resynchronizes them. Another arrangement which concerns clock signal loss detection is shown in U.S. Pat. No. 4,968,951, by Itaya et al., issued Nov. 6, 1990, which discloses a method of restarting a Voltage Controlled Oscillator (VCO) in a phase-locked loop that has stopped oscillating due to characteristics of a wide band oscillation VCO. It further discloses a method of overcoming AC noise problems which cause the VCO to remain in the halted state. Therefore, a design such as Itaya et al. is to be used in conjunction with a VCO in a phase-locked loop where the VCO stops oscillating due to inherent circuit characteristics.

The present invention does not monitor for oscillator signal discontinuation for a single oscillator in a phase-locked loop as in Itaya et al., nor is it a phase detection and synchronization circuit for a VCO in a phase-locked loop as in Coe. The present invention was developed to simultaneously monitor multiple clock signals which provide clock signal redundancy to a digital system. Auxiliary or redundant clock signals may be used in a system which requires a high reliability of clock signal availability. In such a system, the loss of one clock signal must not result in a system shutdown. The present invention monitors each of the clock signals, selects a clock signal source to generate the active system clock signal, and switches to an operational clock signal source upon detection of the loss of the clock signal which is driven by the active system clock signal source.

The present invention also allows the selection of more than one clock signal source to supply the active system clock signal. This is desirable in a system which not only requires continuous clock signal capability, but also requires circuit load redundancy. In such a system, redundant loads may be clocked by separate synchronized clock signals, so that the failure of one circuit load will not result in data loss, since the redundant load would still be operational. This type of a system would require a separate clock signal for each circuit load, so that the loss of one clock signal or the loss of a circuit load would not result in a system failure. The preferred embodiment of the present invention monitors multiple clock signals, and selects two clock signal sources as redundant active system clock signal sources. Upon detection of a clock signal loss, a new clock signal will be selected. Since all redundant clock signals are simultaneously monitored for clock signal loss (even when its associated clock signal source is not selected as the active system clock signal source), the new clock signal can be selected with minimal delay.

The invention monitors for clock signal loss without the need for a separate reference clock. Since redundant clock signals are provided, the clock signals are compared to each other rather than a reference clock. A voting scheme is then used to determine which clock signal has actually failed. By comparing the clock signals to each other rather than to a reference clock signal, extra component costs can be avoided, and the design is simplified.

OBJECTS

It is a primary object of this invention to provide a system to digitally detect clock signal loss.

It is another object of the present invention to simultaneously monitor redundant clock signals for clock signal loss.

It is still another object to provide clocking for the clock signal monitoring circuitry through a signal different from the clock signal which is being monitored.

It is yet another object of the present invention to use a voting scheme to ensure that a clock signal loss has actually occurred before so indicating.

It is another object of the invention to provide selection circuitry to select one or more of the clock signals as the active system clock signals, and to make this selection contingent upon the clock loss detection circuitry issuing a signal which indicates that the clock signals are present and operational.

It is still another object of the present invention to have the selection circuitry switch to operational clock signal sources upon detection of the loss of one or more clock signals, so that the newly selected clock signal sources can provide the system clock signals.

Other more detailed objectives will become apparent from a consideration of the Drawings and the Detailed Description of the Preferred Embodiment.

SUMMARY OF THE INVENTION

The Clock Signal Loss Detection and Recovery Apparatus in a Multiple Clock Signal System provides error monitoring of redundant clock signals which are generated by an equal number of clock source circuits. The clock source circuits also generate periodic sync signals which are designed to recur on predetermined multiples of the clock signal pulses.

The periodic sync signals and the clock signals themselves are used to generate clock signal availability pulses, which are generated by pulse generation circuits. The pulse generation circuits each include a shift register and discrete logic gates to generate the clock signal availability pulses. The shift register is an array of flip-flops, in which the first stage of the shift register inputs the periodic sync pulse from one of the clock source circuits into the data input of the flip-flop. The output of the first stage of the shift register is the input to the data input of the flip-flop of the second stage of the shift register. Each successive stage of the shift register similarly receives the output of the preceding stage as its data input. The stages of the shift register is clocked by providing the associated clock signal to the clock input, depending the corresponding flip-flop, or by providing the logical inversion of the associated clock signal to that clock input, depending on which stage of the flip-flop is to be clocked. Alternate stages of the shift register will receive the clock signal as its clock input, and the remaining stages will receive the logical inversion of the clock signal as its clock input. This allows a pulse to be produced at each successive stage of the shift register on each rising and falling edge of the clock signal. These shift register pulses are then combined by the discrete logic gates to generate the clock signal availability pulses, which consist of a periodic clock pulse and a clock signal present pulse. The clock signal present pulse is used to indicate whether or not the clock signal was present for a predetermined number of clock cycle periods, and the periodic clock pulse is used to clock the circuitry which monitors the clock signal present pulses. The clock signal present pulses are of longer duration than the periodic clock pulse so as to ensure stabilization before the periodic clock pulse transitions to an active level.

The circuitry that monitors the clock signal present pulses is the clock loss detection circuitry. This circuitry includes multiple error latch circuits. Four error latch circuits are present in each clock loss detection circuit in the preferred embodiment. Each clock loss detection circuit is used to monitor one of the clock signal present pulses for errors by comparing that clock signal present pulse to at least two other clock signal present pulses used as references. Each error latch circuit receives one clock signal present pulse as a data input, and this signal is latched on the active triggering edge of a periodic clock pulse which was generated by a different pulse generation circuit than that which generated the clock signal present pulse. The output of an error latch circuit which monitors the clock signal present pulse for the clock signal under consideration, and the output of an error latch circuit which monitors a clock signal present pulse for a reference clock signal, are compared to determine if both clock signal present pulses were active at the same time. A separate comparison is performed for each of the pairs of error latch circuits in which the clock signal under consideration is being compared to a reference clock signal. Using a voting scheme, the number of pairs of error latch circuits that indicated dissimilar clock signal present pulses can be compared to a predetermined number, and if this predetermined number is reached or exceeded, a clock signal error indication will result.

The invention further includes selection control circuitry to monitor the error signals generated by the clock loss detection circuits by monitoring the error signals and generating selection signals depending upon whether or not one or more of the clock signal sources have failed. These selection signals become the inputs to a multiplexer circuit which is used to select one of the redundant clock signals and its associated periodic sync signal as the system clock signals. The selection signals are the control signals to the multiplexer circuit, and the multiplexer circuit will make its selection depending on the state of the selection signals. If the clock signal which is selected as the system clock signal fails, it will be detected, and the selection control circuitry will change the selection signals so that an operational clock signal and associated periodic sync pulse become the system clock signals.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE PREFERRED EMBODIMENT

Figure 1:
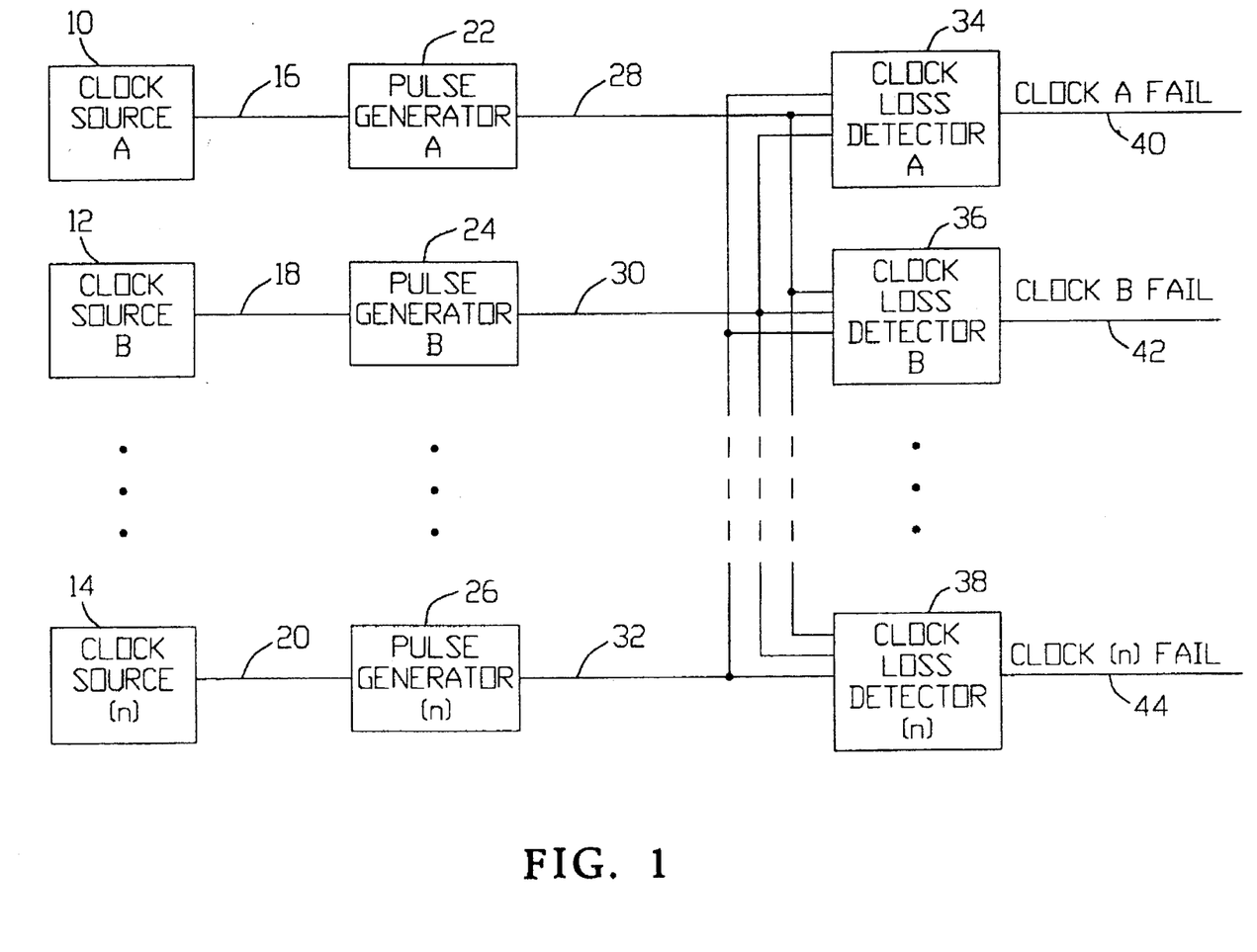
FIG. 1 is a block diagram of the connections of the multiple clock sources to the loss detection circuitry.

FIG. 1 is a block diagram of the connections of the multiple clock sources to the loss detection circuitry. The invention allows varying numbers of clock sources to be used in the system, and the clock signals from each clock source can be monitored to detect the loss of the respective clock signals.

From FIG. 1 it can be seen that any number of clock sources, labeled Clock Source A 10 and Clock Source B 12 through Clock Source (n) 14, may be monitored. Each Clock Source generates a clock signal, labeled here as Clock Signal A 16, and Cluck Signal B 18 through Clock Signal (n) 20. The Clock Sources can be any type of clock signal generator or oscillator known in the art. Each Clock Signal is coupled to a pulse generator, labeled here as Pulse Generator A 22, and Pulse Generator B 24 through Pulse Generator (n) 26. The Pulse Generators manipulate the Clock Signals and produce digital pulses which indicate whether or not its respective Clock Signal is present. Pulse Generator A 22 generates Clock Signal Pulse A 28, Pulse Generator B 24 generates Clock Signal Pulse B 30, and Pulse Generator (n) 26 generates Clock Signal Pulse (n) 32. A more detailed description of the Pulse Generators follows in the discussion of FIG. 6.

The pulses generated by the Pulse Generators become the inputs to circuitry which monitors for the presence of these pulses. Clock Signal Pulse A 28 and Clock Signal Pulse B 30 through Clock Signal Pulse (n) 32 become inputs to Clock Loss Detector A 34 and Clock Loss Detector B 36 through Clock Loss Detector (n) 38 respectively. However, the Clock Loss Detectors also input selected Clock Signal Pulses from other Pulse Generators. This allows the Clock Loss Detectors to compare the Clock Signal Pulse from its corresponding Pulse Generator with Clock Signal Pulses from other Pulse Generators. In FIG. 1, Clock Loss Detector A 34 inputs Clock Signal Pulse B 30 and Clock Signal Pulse (n) 32 as well as its corresponding Clock Signal Pulse A 28. Clock Loss Detector B 36 similarly inputs its corresponding Clock Signal Pulse B 30, but also inputs Clock Signal Pulse A 28 and Clock Signal Pulse (n) 32. This allows a comparison in each Clock Loss Detector of the Clock Signal Pulse from the corresponding Pulse Generator to the Clock Signal Pulses from other selected Pulse Generators, and the detection of a missing Clock Signal Pulse will indicate a loss of its corresponding Clock Signal. A Clock Loss Detector may be designed to compare any number of Clock Signal Pulses. Each Clock Loss Detector provides an error output which indicates whether the associated Clock Signal, and hence the associated Clock Signal Pulse, has stopped functioning properly. Upon detection of an error, Clock Loss Detector A 34 outputs an error signal labeled Clock A Fail 40, Clock Loss Detector B 36 outputs error signal Clock B Fail 42, which continues through error signal Clock (n) Fail 44. The Clock Loss Detectors will be discussed in full detail in the discussion of FIG. 8.

Figure 2:
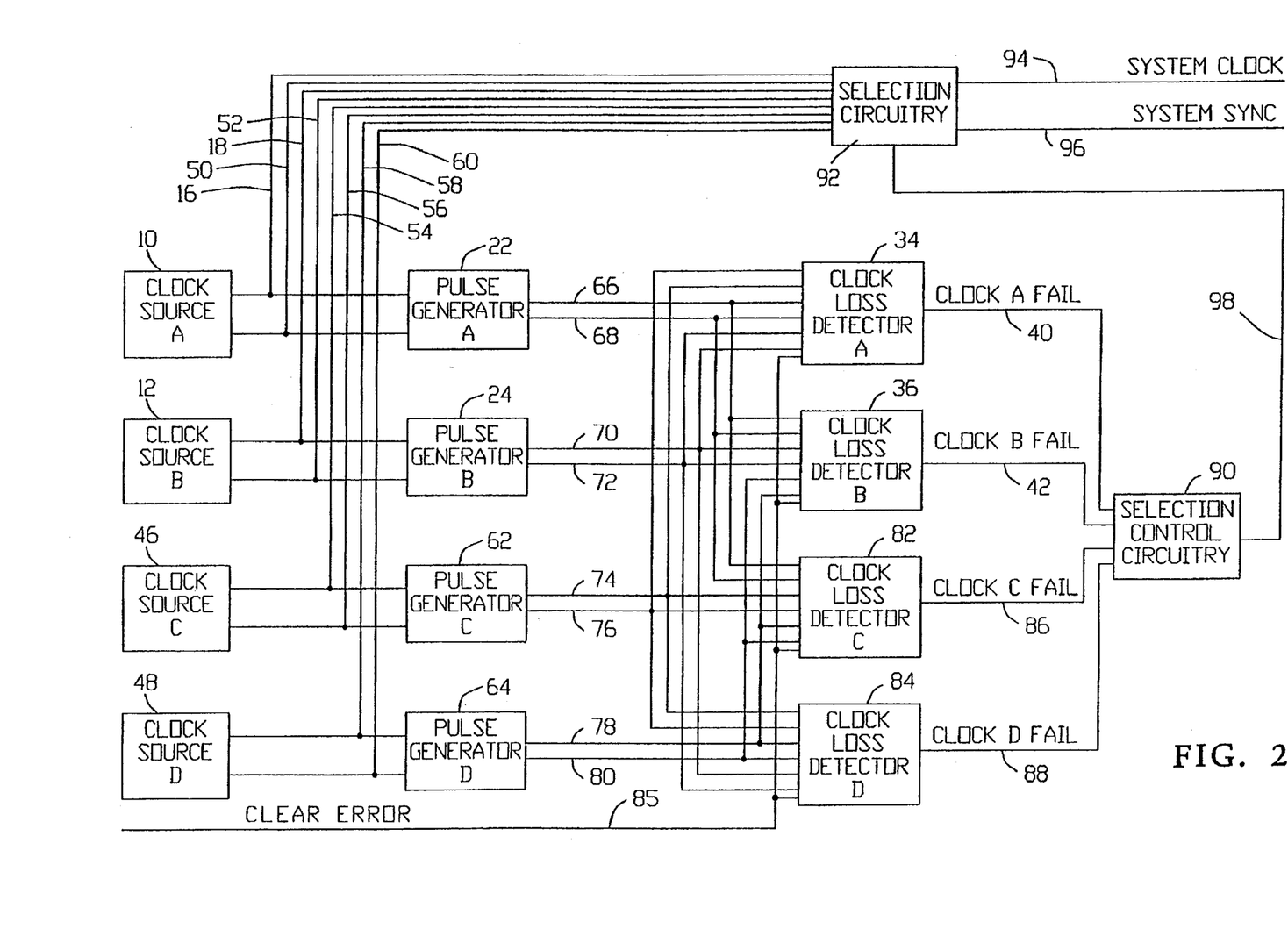
FIG. 2 is a more detailed block diagram of the connections of the multiple clock sources to the loss detection circuitry in the preferred embodiment.

FIG. 2 is a more detailed block diagram of the connections of the multiple clock sources to the loss detection circuitry in the preferred embodiment. Four clock source circuits are used in the preferred embodiment. These include Clock Source A 10, Clock Source B 12, Clock Source C 46, and Clock Source D 48. The Clock Source circuits of the preferred embodiment each provide a clock signal and a synchronization (sync) signal. Clock Source A 10 generates Clock Signal A 16 and Sync Signal A 50, Clock Source B 12 generates Clock Signal B 18 and Sync Signal B 52, Clock Source C 46 generates Clock Signal C 54 and Sync Signal C 56, and Clock Source D 48 generates Clock Signal D 58 and Sync Signal D 60. The Clock Signals are oscillatory digital signals which can be used as a synchronous clock signal for a digital system. The Sync Signals are derived from the Clock Signals, and are periodic pulses occurring every eighth pulse of the corresponding Clock Signal.

Figure 3:
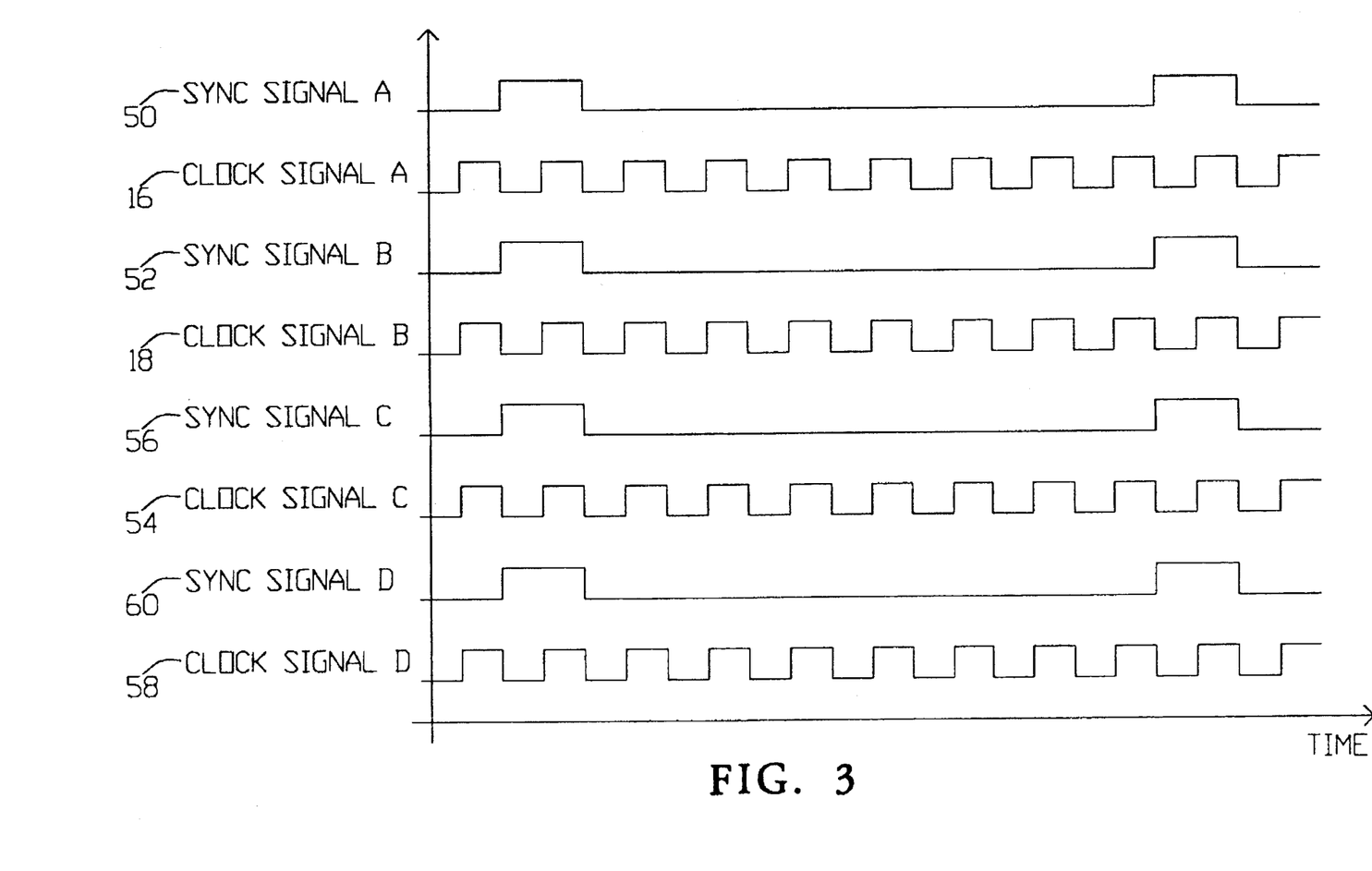
FIG. 3 is a waveform diagram of the Clock Signals and the Sync Signals.

FIG. 3 is a waveform diagram of the Clock Signals and the Sync Signals. As shown, Clock Signal A 16, Clock Signal B 18, Clock Signal C 54, and Clock Signal D 58 are oscillating at the same frequency and have been synchronized with one another. The synchronization of these clock signals is not pertinent to the present invention, and will not be discussed. The Sync Signals are generated within the Clock Source circuitry, and as seen in FIG. 3 the Sync Signals are pulses which occur every eighth pulse of the Clock Signals, and each pulse is the width of one full Clock Signal period. The Sync Signals of the preferred embodiment include Sync Signal A 50, Sync Signal B 52, Sync Signal C 56, and Sync Signal D 60.

Returning to FIG. 2, the Clock Signal and Sync Signal from a particular Clock Source are inputted into a Pulse Generator. Clock Signal A 16 and Sync Signal A 50 are coupled to Pulse Generator A 22, Clock Signal B 18 and Sync Signal B 52 are coupled to Pulse Generator B 24, Clock Signal C 54 and Sync Signal C 56 are coupled to Pulse Generator C 62, and Clock Signal D 58 and Sync Signal D 60 are coupled to Pulse Generator D 64. The Pulse Generators receive the Clock Signal and the Sync Signal, and generate two periodic output pulses in response to the Clock Signal and Sync Signal. Pulse Generator A 22 generates Long Sync A 66 and Short Sync A 68, Pulse Generator B 24 generates Long Sync B 70 and Short Sync B 72, Pulse Generator C 62 generates Long Sync C 74 and Short Sync C 76, and Pulse Generator D 64 generates Long Sync D 78 and Short Sync D 80. The Long Sync and Short Sync are pulses which can be easily monitored for their presence.

Figure 4:
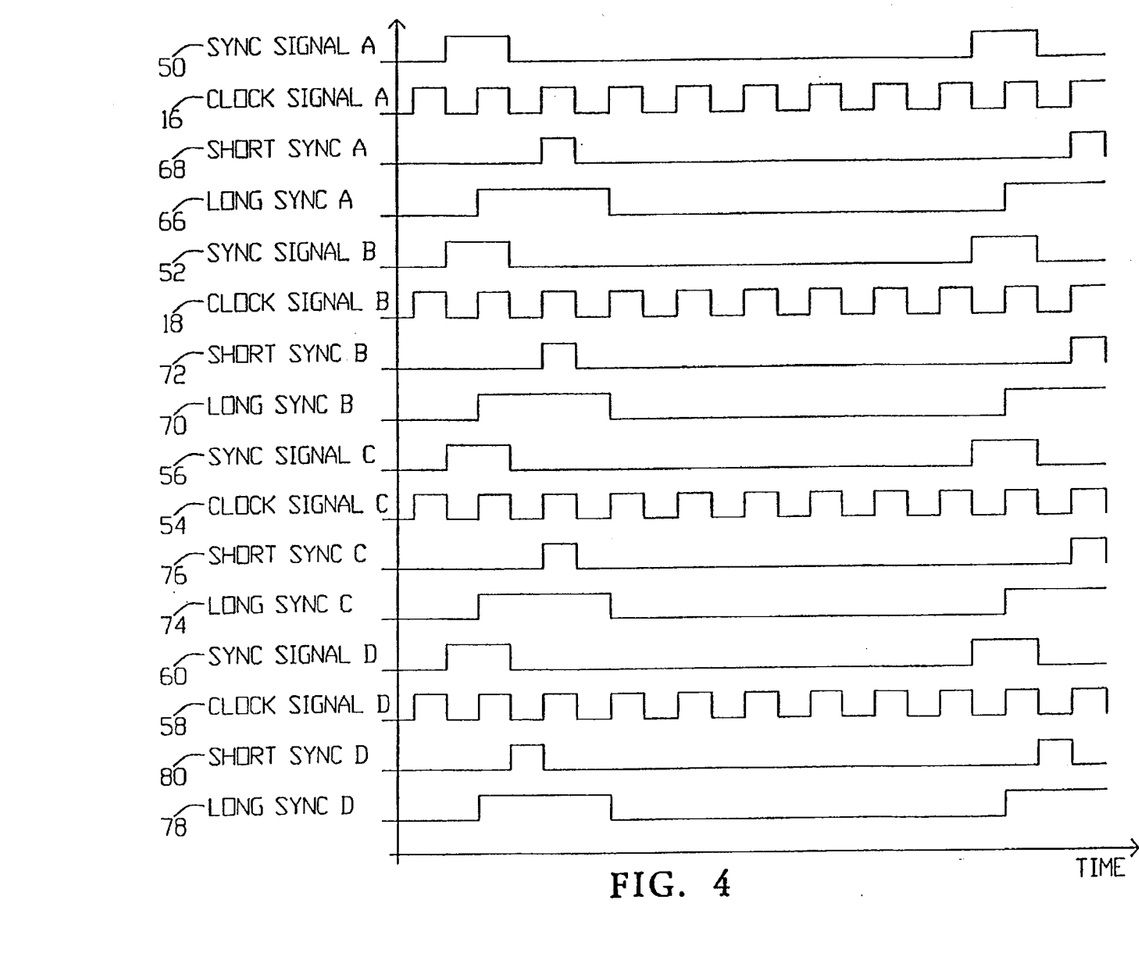
FIG. 4 is a waveform diagram of the Short Sync and Long Sync pulses in relation to their respective Clock and Sync Signals.

FIG. 4 is a waveform diagram of the Short Sync and Long Sync pulses in relation to their respective Clock and Sync Signals. A Short Sync pulse will become active at approximately the same time as its respective Sync Signal becomes active, and will have a pulse width equal to one-half of one period of its respective Clock Signal. Short Sync A 68, Short Sync B 72, Short Sync C 76 and Short Sync D 80 become active at the same time as Sync Signal A 50, Sync Signal B 52, Sync Signal C 56 and Sync Signal D 60 respectively become active, and the duration is equal to one-half of one period of Clock Signal A 16, Clock Signal B 18, Clock Signal C 54 and Clock Signal D 58 respectively. Long Sync A 66, Long Sync B 70, Long Sync C 74 and Long Sync D 78 each are active for two full periods of their corresponding Clock Signals (Clock Signal A, Clock Signal B, Clock Signal C and Clock Signal D respectively). The Long Sync signals are designed to be active and stabilized prior to activation of their respective Short Sync signals. The Long Sync and Short Sync pulses are the signals that indicate whether their respective Clock Signal is present or not. The utility of the Long Sync and Short Sync pulses will become more apparent in the discussion of FIGS. 6 and 8.

Again returning to FIG. 2, it can be seen that the Long Sync and Short Sync pulses become inputs to the Clock Loss Detectors. Long Sync A 66 and Short Sync A 68 are inputs to Clock Loss Detector A 34, Clock Loss Detector B 36, and Clock Loss Detector C 82. Long Sync B 70 and Short Sync B 72 are inputs to Cluck Loss Detector A 34, Clock Loss Detector B 36, and Clock Loss Detector D 84. Long Sync C 74 and Short Sync C 76 are inputs to Clock Loss Detector A 34, Clock Loss Detector C 82, and Clock Loss Detector D 84. Finally, Long Sync D 78 and Short Sync D 80 are inputs to Clock Loss Detector B 36, Clock Loss Detector C 82, and Clock Loss Detector D 84. Each Clock Loss Detector will compare the time of occurrence of one Long Sync pulse with that of the other inputted Long Sync pulses. The Short Sync pulses act as a triggering clock edge for the Clock Loss Detector circuitry so as to define a time at which the Long Sync pulses will be compared to each other. Each Clock Loss Detector further receives the Clear Error signal 85 to clear the Clock Loss Detector circuit after the loss of a clock is detected, as will be described further below.

Each Clock Loss Detector in the preferred embodiment inputs three Long Sync and Short Sync signals. By comparing three Long Sync pulses, the Clock Loss Detectors can determine which of the inputted Long Sync pulses has failed by using a type of voting method. As will become more apparent in the discussion of FIG. 8, the Clock Loss Detectors could monitor only two Long Sync and Short Sync pulses, or more than three Long Sync and Short Sync pulses if so desired. The monitoring of three Long Sync and Short Sync pulses was used in the preferred embodiment because it is the minimum number required to pinpoint which Clock Signal has failed, if any.

The Clock Loss Detectors will output an error indication upon recognition of a Clock Signal failure. If Clock Loss Detector A 34 determines that Clock Signal A 16 is not present, it will issue a Clock A Fail 40 signal. If Clock Loss Detector B 36 determines that Clock Signal B 18 is not present, it will issue a Clock B Fail 42 signal. If Clock Loss Detector C 82 determines that Clock Signal C 54 is not present, it will issue a Clock C Fail 86 signal. Finally, if Clock Loss Detector D 84 determines that Clock Signal D 58 is not present, it will issue a Clock D Fail 88 signal. These signals indicate to the Selection Control Circuitry 90 which set of Clock Signals and Sync Signals should be selected by the Selection Circuitry 92. The selected Clock Signal and Sync Signal will become the System Clock 94 signal and the System Sync 96 signal which then provides the digital, synchronous clock to the entire system. Therefore, redundant clock sources may be used, and the present invention will monitor for a loss of a clock signal, and will switch to an operational clock signal to become the System Clock upon recognition of such a loss of the clock signal.

In order to select one Clock Signal and associated Sync Signal as the System Clock 94 and System Sync 96 signals, Clock Signals A 16, B 18, C 54 and D 58, as well as Sync Signals A 50, B 52, C 56 and D 60 must be coupled to the Selection Circuitry 92. The Selection Circuitry works as a multiplexing unit which selects a Clock Signal and associated Sync Signal depending upon the state of the Selection Signals 98. Such a multiplexing unit is well known, and obvious to one skilled in the art. The Selection Signals 98 are generated by logic within the Selection Control Circuitry 90 in response to the state of the Clock A Fail 40, Clock B Fail 42, Clock C Fail 86 and Clock D Fail 88 error signals. The Selection Control Circuitry 90 will be discussed in more detail in conjunction with the description of FIG. 11.

Figure 5:
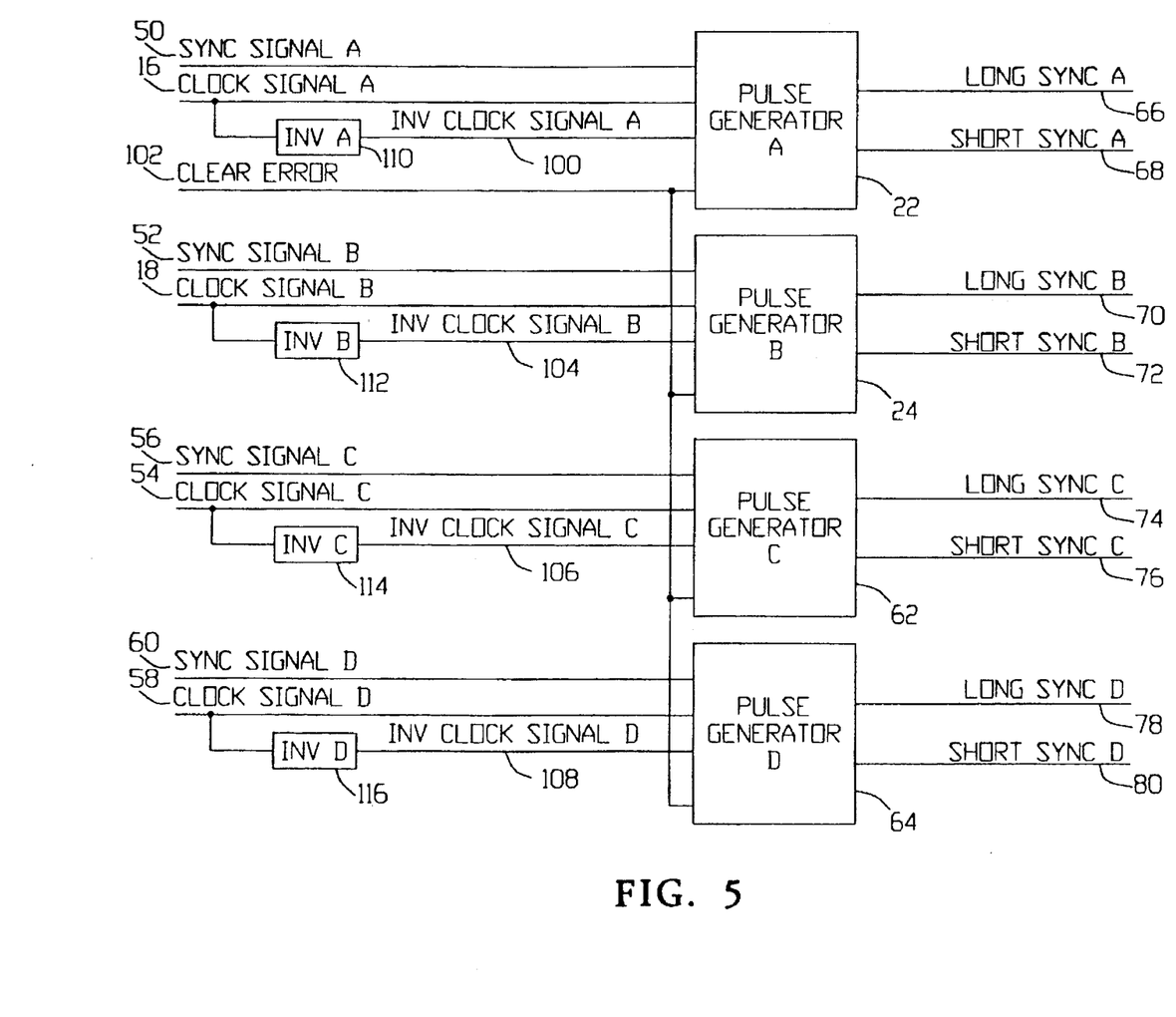
FIG. 5 is a block diagram showing all of the inputs and outputs for each Pulse Generator.

FIG. 5 is a block diagram showing all of the inputs and outputs for each Pulse Generator. FIG. 2 also shows inputs and outputs for the Pulse Generators, but FIG. 2 does not show all of the inputs. In FIG. 5, it can be seen that each Pulse Generator has two more inputs than is shown in FIG. 2: an Inv Clock Signal, and a Clear Error signal. Pulse Generator A 22 therefore receives as inputs Sync Signal A 50, Clock Signal A 16, Inv Clock Signal A 100 and Clear Error 102, and outputs Long Sync A 66 and Short Sync A 68. Pulse Generator B 24 receives as inputs Sync Signal B 52, Clock Signal B 18, Inv Clock Signal B 104 and Clear Error 102, and outputs Long Sync B 70 and Short Sync B 72. Pulse Generator C 62 receives as inputs Sync Signal C 56, Clock Signal C 54, Inv Clock Signal C 106 and Clear Error 102, and outputs Long Sync C 74 and Short Sync C 76. Pulse Generator D 64 receives as inputs Sync Signal D 60, Clock Signal D 58, Inv Clock Signal D 108 and Clear Error 102, and outputs Long Sync D 78 and Short Sync D 80.

The Inv Clock Signal for each Pulse Generator is merely the inversion of the associated Clock Signal. Clock Signal A 16 is inverted by Inverter A 110 to generate Inv Clock Signal A 100, Clock Signal B 18 is inverted by Inverter B 112 to generate Inv Clock Signal B 104, Clock Signal C 54 is inverted by Inverter C 114 to generate Inv Clock Signal C 106, and Clock Signal D 58 is inverted by Inverter D 116 to generate Inv Clock Signal D 108. These inverted clock signals are used to clock circuitry within the Clock Loss Detectors on what would be the falling edge of the Clock Signal. The purpose for clocking some of the Clock Loss Detector circuitry on the falling edge of a Clock Signal pulse will become apparent in the discussion of FIG. 6.

The Clear Error 102 signal is common to all of the Pulse Generators A 22, B 24, C 62 and D 64. This signal will be issued following an error indication by any of the Clock Loss Detectors in order to reset the shift registers which are used in the Pulse Generators.

Figure 6:
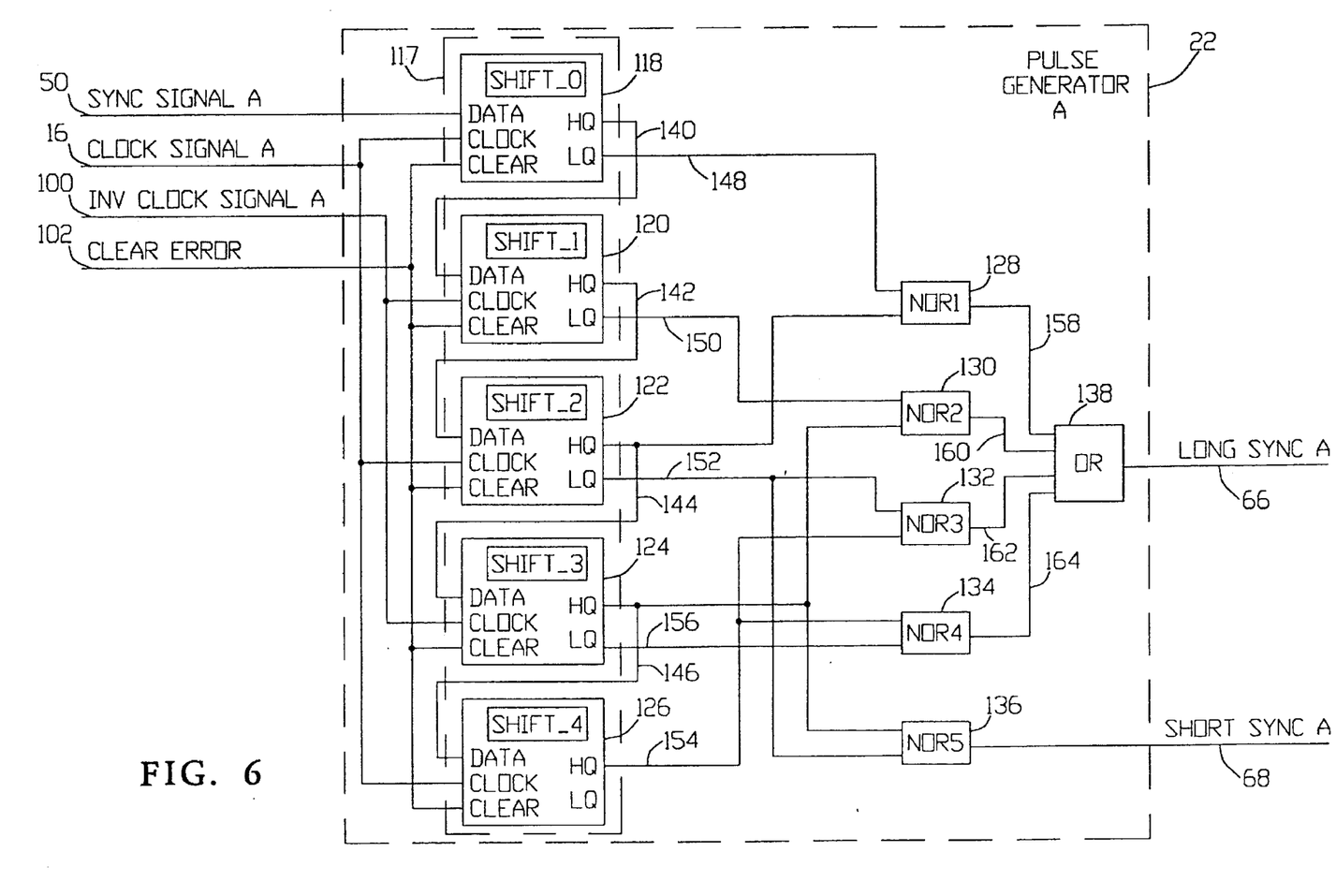
FIG. 6 is a block diagram showing the preferred embodiment of the circuitry comprising Pulse Generator A.

FIG. 6 is a block diagram showing the preferred embodiment of the circuitry comprising Pulse Generator A. Pulse Generators A 22, B 24, C 62 and D 64 of the preferred embodiment comprise identical circuitry, and the following discussion of the operation of Pulse Generator A applies equally as well to Pulse Generators B, C and D. The only difference is the inputs and outputs to each Phase Generator which was discussed in conjunction with FIG. 5.

Referring to FIG. 6, Pulse Generator A 22 includes a Shift Register 117 having five stages: Shift_0 118, Shift$_{13}$1 120, Shift_2 122, Shift_3 124 and Shift_4 126. Also included are five NOR gates, labeled Nor1 128, Nor2 130, Nor3 132, Nor4 134 and Nor5 136, and one OR gate labeled Or 138. The five stage Shift Register 117 will shift the Sync Signal A 50 entering the DATA input of Shift_0 118 through the Shift Register at each half-period of Cluck Signal A 16. It can be shifted on each half-period of Clock Signal A because Clock Signal A clocks the even shift stages, and an inverted clock signal labeled Inv Clock Signal A 100 clocks the odd shift stages. Therefore, Clock Signal A 16 will clock Shift_0 118, Shift_2 122 and Shift_4 126, and Inv Clock Signal A 100 will clock Shift_1 120 and Shift_3 124. This allows a shift to occur on each rising or falling edge of the Clock Signal A. The Sync Signal A 50 is shifted from one stage to the next by connecting the non-inverting output of each stage to the DATA input of the succeeding stage, so that Shift_0 HQ 140 is connected to the DATA input of Shift_1 120, Shift_1 HQ 142 is connected to the DATA input of Shift_2 122, Shift_2 HQ 144 is connected to the DATA input of Shift_3 124, and Shift_3 HQ 146 is connected to the DATA input of Shift_4 126. The CLEAR input on each stage receives the Clear Error 102 signal, which will be issued following the detection of a Clock Signal error in order to reset each stage.

Figure 7:
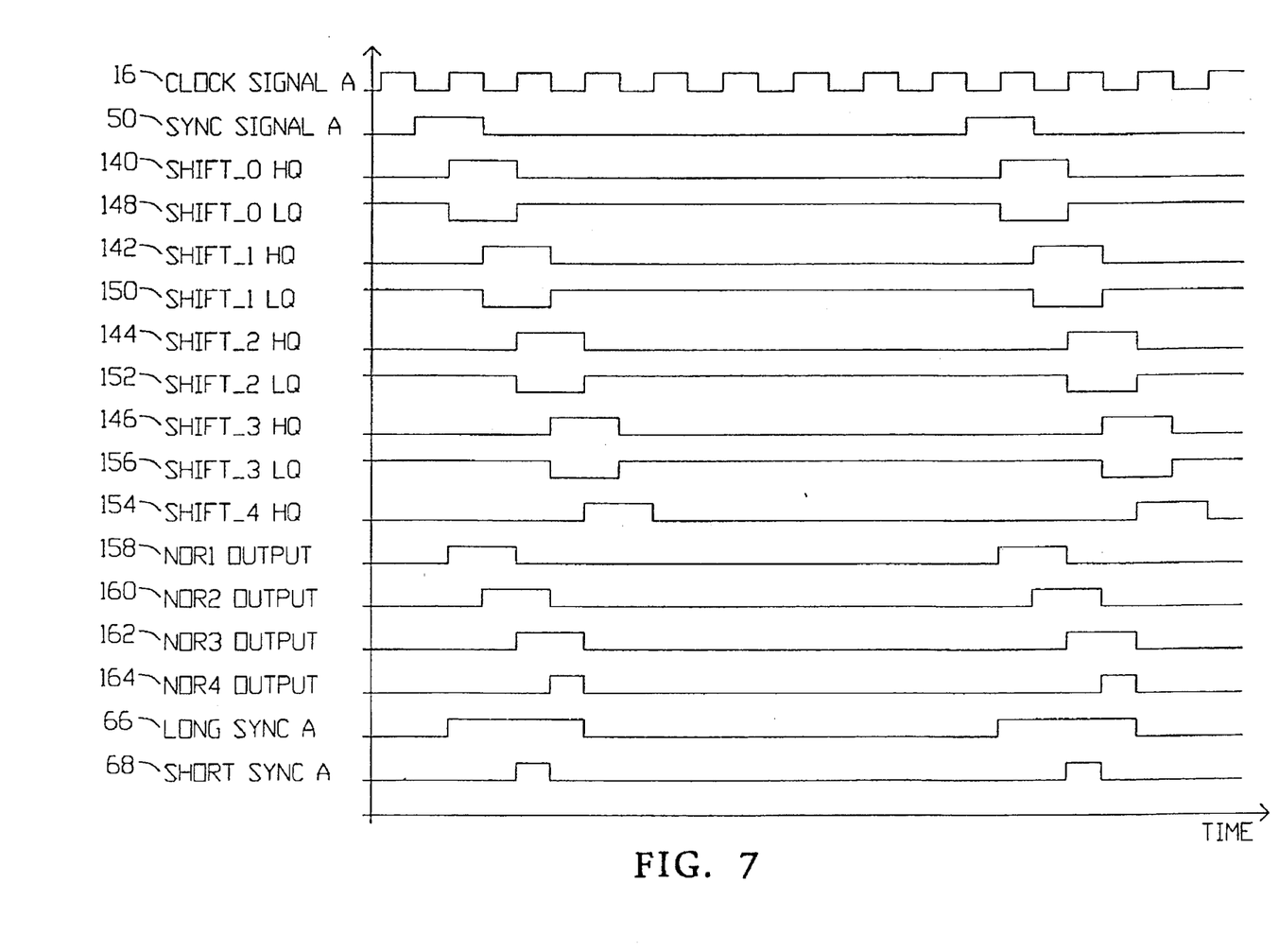
FIG. 7 is a waveform diagram showing how the Sync Signal A pulse is shifted through each shift stage of the Shift Register.

FIG. 7 is a waveform diagram showing how the Sync Signal A pulse is shifted through each shift stage of the Shift Register 117. As stated previously, each stage of the Shift Register 117 latches the Sync Signal A 50 one-half period after the preceding stage latched it.

Referring again to FIG. 6, selected shift stage outputs are coupled to the logic gates including Nor1 128, Nor2 130, Nor3 132, Nor4 134, Nor5 136 and Or 138 in order to produce the Long Sync A 66 and Short Sync A 68 signals. The inputs to Nor1 128 are Shift_0 LQ 148 and Shift_2 HQ 144; the inputs to Nor2 130 are Shift_1 LQ 150 and Shift_3 HQ 146; the inputs to Nor3 132 are Shift_2 LQ 152 and Shift_4 HQ 154; and the inputs to Nor4 134 are Shift_4 HQ 154 and Shift_3 LQ 156. The outputs of the NOR gates, labeled Nor1 Output 158, Nor2 Output 160, Nor3 Output 162 and Nor4 Output 164 become inputs to Or 138, where they are combined to produce the Long Sync A 66 signal. The inputs to Nor5 136 are Shift_3 HQ 146 and Shift_2 LQ 152, and the output of Nor5 is the Short Sync A 68 signal.

Referring to FIG. 7, it can be seen how the Long Sync A 66 signal is generated by OR'ing the Nor1 Output 158, Nor2 Output 160, Nor3 Output 162 and Nor 4 Output 164. It is also apparent that the Short Sync A 68 pulses are generated by inputting Shift_3 HQ 146 and Shift_2 LQ 152 into Nor5 136. It should be noted that the Long Sync and Short Sync signals would not need to be produced on each occurrence of the Sync Signal. In the preferred embodiment, 4-bit counters are connected to the outputs of Or 138 and Nor5 136 to generate a Long Sync and Short Sync pulse on every fourth occurrence of the Sync Signal. The implementation of such a counter to count occurrences of a particular pulse is well known and obvious to one skilled in the art. Disregarding a chosen number of Short Sync and Long Sync signals simply allows the Selection Control Circuitry 90 to monitor for failure conditions at a more manageable rate.

Figure 8:
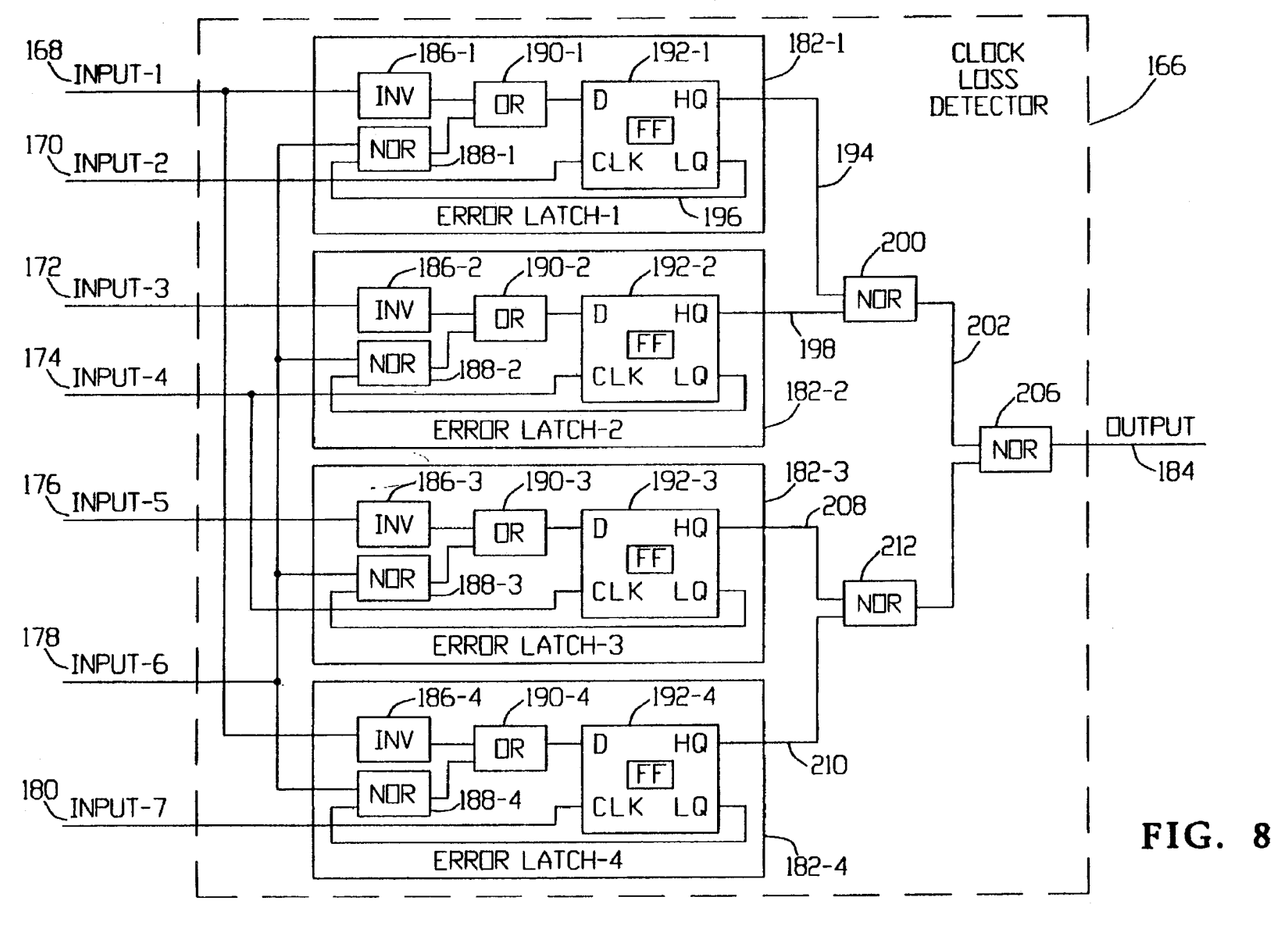
FIG. 8 is a schematic diagram of a Clock Loss Detector.

FIG. 8 is a schematic diagram of a Clock Loss Detector. Clock Loss Detectors A 34, B 36, C 82 and D 84 all include the same internal circuitry, and therefore the operation of an illustrative clock Loss Detector, labeled Clock Loss Detector 166, will be described. The Clock Loss Detector 166 description will be applicable to Clock Loss Detectors A 34, B 36, C 82 and D 84, and the only difference between these Clock Loss Detectors is the designations of the inputs and outputs.

The Clock Loss Detector 166 receives seven inputs, labeled input-1 168, Input-2 170, Input-3 172, Input-4 174, Input-5 176, Input-6 178 and Input-7 180. Input-1, Input-2, and Input-6 are inputs to the Error Latch-1 182-1 circuitry, Input-3, Input-4, and Input-6 are inputs to the Error Latch-2 182-2 circuitry, Input-5, Input-4, and Input-6 are inputs to the Error Latch-3 182-3 circuitry, and Input-1, Input-7, and Input-6 are inputs to the Error Latch-4 182-4 circuitry. The Output 184 signal indicates whether an error has been detected.

Figure 9:
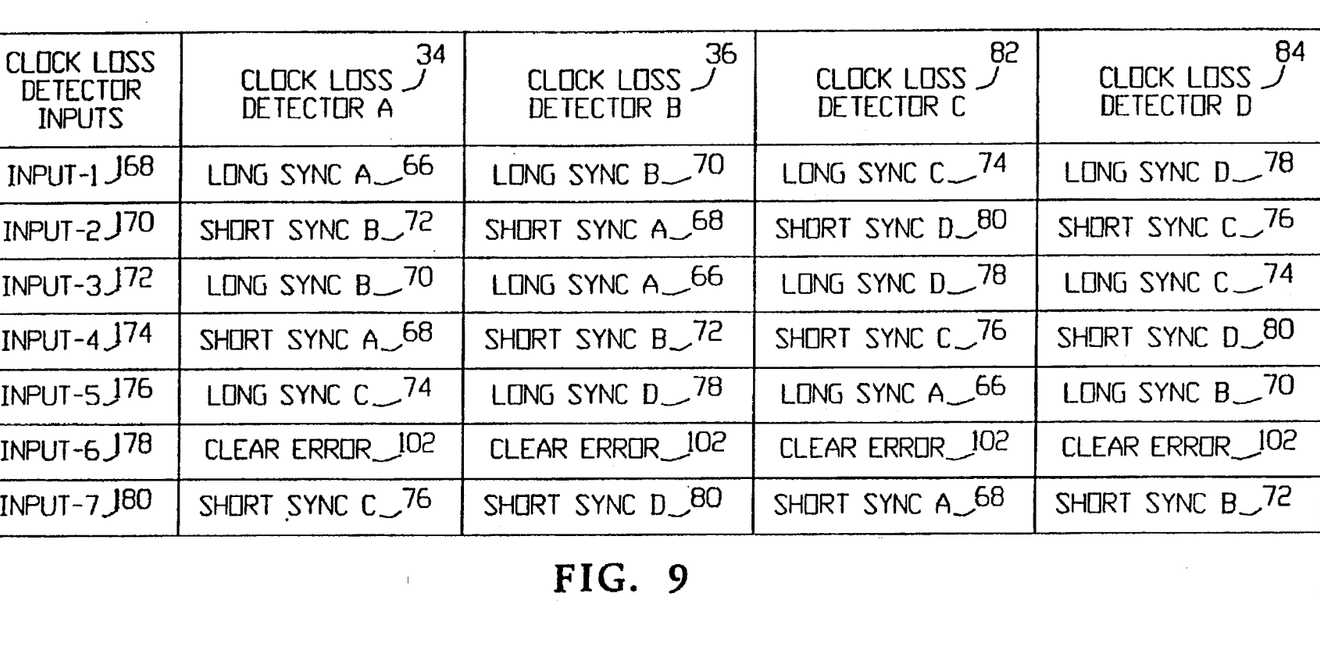
FIG. 9 is a table which cross-references the Clock Loss Detector inputs to the Clock Loss Detector A, B, C, and D inputs.

FIG. 9 is a table which cross-references the Clock Loss Detector inputs to the Clock Loss Detector A, B, C, and D inputs. Therefore, the generic Clock Loss Detector 166 of FIG. 8 represents Clock Loss Detector A 34 where Input-1 168 is Long Sync A 66, Input-2 170 is Short Sync B 72, Input-3 172 is Long Sync B 70, Input-4 174 is Short Sync A 68, Input-5 176 is Long Sync C 74, Input-6 178 is Clear Error 102 and Input-7 180 is Short Sync C 76. The Clock Loss Detector 166 represents Clock Loss Detector B 36 where Input-1 168 is Long Sync B 70, Input-2 170 is Short Sync A 68, Input-3 172 is Long Sync A 66, Input-4 174 is Short Sync B 72, Input-5 176 is Long Sync D 78, Input-6 178 is Clear Error 102 and Input-7 180 is Short Sync D 80. The Clock Loss Detector 166 represents Clock Loss Detector C 82 where Input-1 168 is Long Sync C 74, Input-2 170 is Short Sync D 80, Input-3 172 is Long Sync D 78, Input-4 174 is Short Sync C 76, Input-5 176 is Long Sync A 66, Input-6 178 is Clear Error 102 and Input-7 180 is Short Sync A 68. Finally, the Clock Loss Detector 166 represents Clock Loss Detector D 84 where Input-1 168 is Long Sync D 78, Input-2 170 is Short Sync C 76, Input-3 172 is Long Sync C 74, Input-4 174 is Short Sync D 80, Input-5 176 is Long Sync B 70, Input-6 178 is Clear Error 102 and Input-7 180 is Short Sync B 72. All of these connections, with the exception of the Clear Error signal, are shown in FIG. 2.

Figure 10:
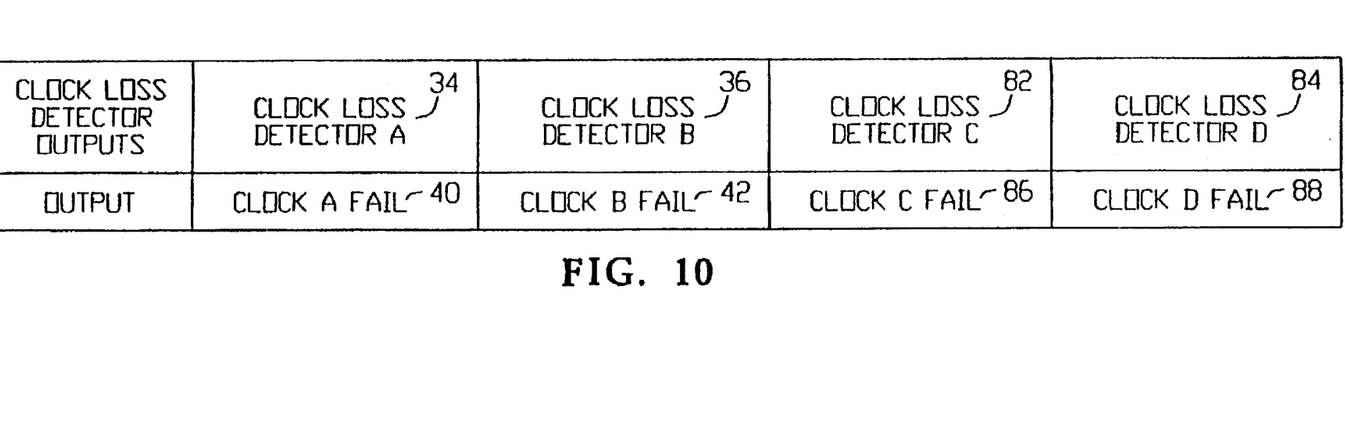
FIG. 10 is a table which cross-references the Clock Loss Detector output to the Clock Loss Detector A, B, C, and D outputs.

FIG. 10 is a table which cross-references the Clock Loss Detector output to the Clock Loss Detector A, B, C, and D outputs. Where the inputs are such that the generic Clock Loss Detector 166 of FIG. 8 represents Clock Loss Detector A 34, the error signal output is Clock A Fail 40. Where the inputs are such that the generic Clock Loss Detector 166 represents Clock Loss Detector B 36, the error signal output is Clock B Fail 42. Where the inputs are such that the generic Clock Loss Detector 166 represents Clock Loss Detector C 82, the error signal output is Clock C Fail 86. Finally, where the inputs are such that the generic Clock Loss Detector 166 represents Clock Loss Detector D 84, the error signal output is Clock D Fail 88.

Returning to FIG. 8, the Clock Loss Detector 166 includes four identical error latching circuits labeled Error Latch-1 182-1, Error Latch-2 182-2, Error Latch-3 182-3 and Error Latch-4 182-4. The Clock Loss Detector is designed to detect the loss of the Input-1 168 signal by monitoring for the loss of the Clock Signal which generates the Input-1 signal. This is performed by separately comparing the Input-1 168 signal with the Input-3 172 signal and the Input-5 176 signal. As seen in FIG. 9, the inputs labeled Input-1, Input-3, and Input-5 are all Long Sync signals.

In order to compare these signals, each Error Latch circuit uses a flip-flop to latch the state of the corresponding Long Sync signal. The flip-flop is clocked by a Short Sync signal (Input-2 170, Input-4 174, or Input-7 180) which was derived from the Clock Signal different than the Clock Signal which generated the Long Sync signal. By using a Short Sync derived from a different Clock Signal than the Clock Signal which generates the Long Sync signal, the flip-flop will still be able to latch the state of the Long Sync signal even where the Clock Signal which generated the Long Sync signal has failed.

To understand this, the Error Latch circuitry must be described. Error Latch-1 182-1 contains identical circuitry to that of Error Latch-2 182-2, Error Latch-3 182-3, and Error Latch-4 182-4. Error Latch-1 182-1 contains Inv 186-1, Nor 188-1, Or 190-1, and FF 192-1. Error Latch-2 182-2 contains Inv 186-2, Nor 188-2, Or 190-2, and FF 192-2. Error Latch-3 182-3 contains Inv 186-3, Nor 188-3, Or 190-3, and FF 192-3. Finally, Error Latch-4 182-4 contains Inv 186-4, Nor 188-4, Or 190-4, and FF 192-4. Three signals enter each Error Latch circuit, consisting of one Long Sync signal, one Short Sync signal, and the Clear Error signal, as seen from FIGS. 8 and 9. Because the operation of each of the Error Latch circuits is identical in each of the Clock Loss Detectors, only the operation of Error Latch-1 182-1 in Clock Loss Detector A 34 will be described, and the operation of Error Latch-2 182-2, Error Latch-3 182-3, and Error Latch-4 182-4 in each of the remaining Clock Loss Detectors can be described by analogy.

Using FIGS. 8 and 9, Error Latch-1 182-1 of Clock Loss Detector A 34 receives Long Sync A 66 at Inv 186-1, Short Sync B 72 at the clock (CLK) input of the flip-flop labeled FF 192-1, and the Clear Error 102 signal at one of the two inputs of the Nor 188-1 gate. The initial state of FF 192-1 in Error Latch-1 182-1 is a low logic level on HQ Output-1 194 from the HQ output terminal of FF 192-1, and a high logic level on LQ Feedback-1 196 from the LQ output terminal of FF 192-1. LQ Feedback-1 196 is input into NOR 188-1, as well as the Clear Error 102 on Input-6 178 which will be at a low logic level during normal operation. Therefore, the output of Nor 188-1 and the corresponding input of Or 190-1 will be at a low logic level. The remaining input on the Or 190-1 gate will be the inverted Long Sync A 66 signal, since the output of Inv 186-1 is connected to the remaining input of Or 190-1. Thus, the state of the Long Sync A 66 signal will determine the state of the output of the Or 190-1 gate during normal operation. The output of Or 190-1 is connected to the D input of FF 192-1, which will latch the state of the D input at the time that FF 192-1 receives a Short Sync B 72 pulse at the CLK input.

Referring to FIGS. 4 and 8, it can be seen that at the time the Short Sync B 72 pulse clocks the CLK input of FF 192-1, the inverted Long Sync A 66 signal will be at a low logic level. Therefore, during normal operation where the Clock Signal A 16 and Sync Signal A 50 are operational, Error Latch-1 182-1 will generate a low logic level at HQ Output-1 194. If Clock Signal A 16 were to stop operating so that Long Sync A 66 was continually at a low logic level, Inv 186-1 would invert this logic level to a high logic level, and the HQ Output-1 194 would transition to a high logic level at the rising edge of the Short Sync B 72 pulse.

Again referring to FIGS. 8 and 9, Error Latch-2 182-2 operates simultaneously with Error Latch-1 182-1. As seen in FIG. 9, the inputs to Error Latch-2 182-2 of Clock Loss Detector A 34 consist of Long Sync B 70, Short Sync A 68, and the Clear Error 102 signal. Operation is identical to Error Latch-1 182-1, and the HQ Output-2 198 will be in the state of the inverted Long Sync B 70 signal at the time of the occurrence of the Short Sync A 68 pulse. The HQ Output-1 194 from Error Latch-1 182-1 and the HQ Output-2 198 from Error Latch-2 182-2 are then input into Nor 200. If these two inputs recognize that its inputs are not both low logic levels, the Nor 200 gate will output a low logic level on Error Line 202. However, it would be unknown as to whether Clock Signal A 16 or Clock Signal B 18 had failed, since the failure of either would result in unlike outputs at HQ Output-1 194 and HQ Output-2 198. For this reason, a voting scheme is employed, and Long Sync A 66 is compared to another Long Sync signal. Therefore, Error Latch-3 182-3 and Error Latch-4 182-4 perform a function similar to that of Error Latch-1 182-1 and Error Latch-2 182-2 by also comparing Long Sync A 66 to another Long Sync signal. Therefore, Long Sync A 66 (Input-1 168) is compared to both Long Sync B 70 (Input-3 172) and Long Sync C 74 (Input-5 176). If both of these comparisons reveal an inconsistency in their respective HQ Outputs, a Clock A Fail 40 will occur at the Clock Loss Detector A 34 output, labeled Output 184. In other words, if Long Sync A 66 is not transitioning symmetrically with Long Sync B 70, the HQ Output-1 194 and HQ Output-2 198 inputs to Nor 200 will produce a low logic level at the input of Nor 204. Similarly, if Long Sync A 66 is not transitioning symmetrically with Long Sync C 74, the HQ Output-3 206 and HQ Output-4 208 inputs to Nor 210 will produce a low logic level at the other input of Nor 204. When both inputs to Nor 204 are at a low logic level, the output of Nor 204 will transition to a high logic level, which results in an active Clock A Fail 40.

Figure 11:
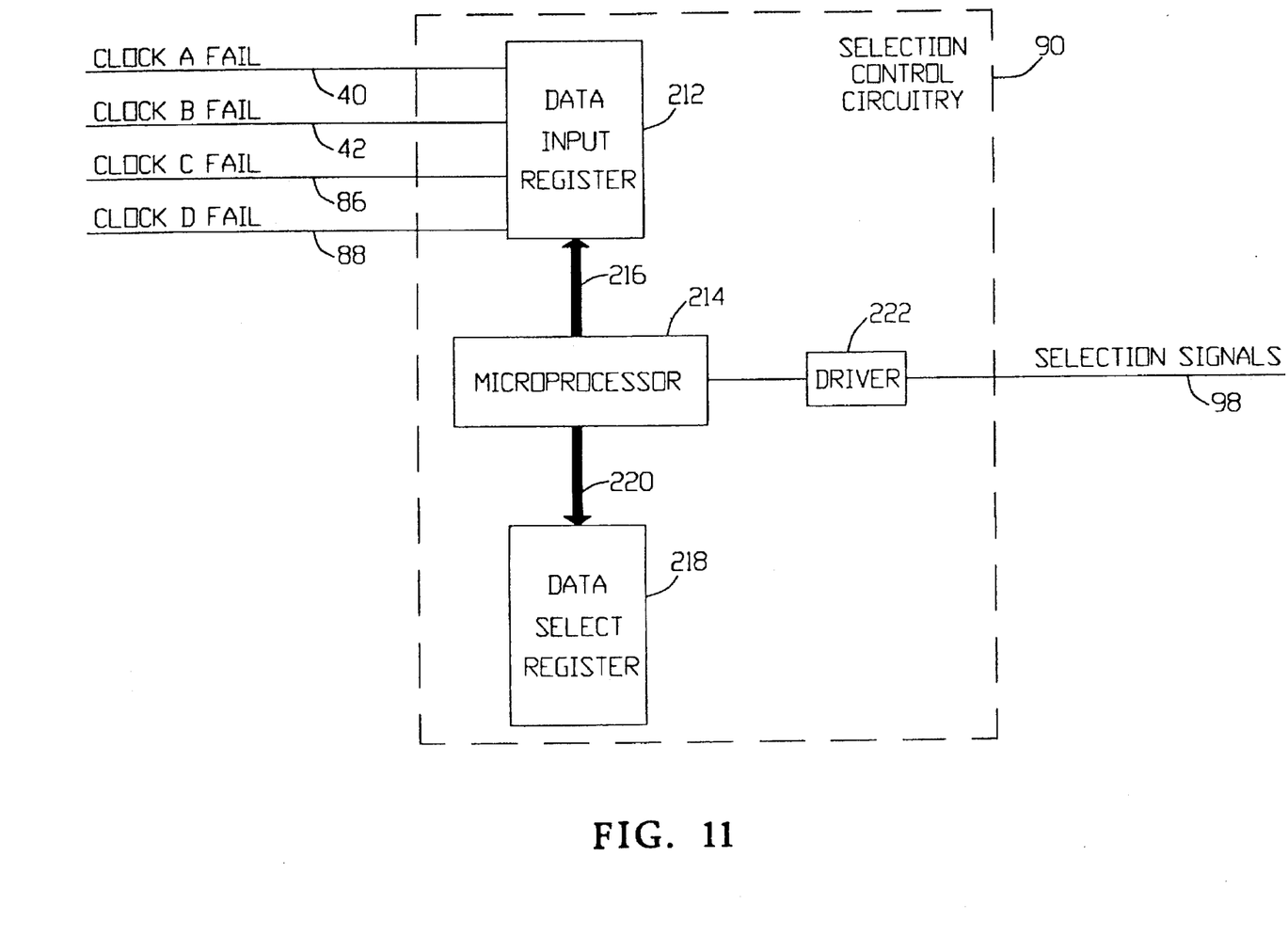
FIG. 11 is a block diagram showing the elements comprising the Selection Control Circuitry in the preferred embodiment.

FIG. 11 is a block diagram showing the elements comprising the Selection Control Circuitry in the preferred embodiment. Inputs to the Selection Control Circuitry 90 include Clock A Fail 40, Clock B Fail 42, Clock C Fail 86, and Clock D Fail 88. These signals originated at Clock Loss Detector A 34, Clock Loss Detector B 36, Clock Loss Detector C 82, and Clock Loss Detector D 84 respectively, as shown in FIG. 2. These inputs are received and latched by the Data Input Register 212. A low logic level on each of the inputs indicates that no clock signals have failed, as previously described. Microprocessor 214 is programmed to read the data from the Data Input Register 212 on Data Input Bus 216. If the Microprocessor 214 determines from the data on the Data Input Bus 216 that all Clock Fail inputs are at a low logic level, the Microprocessor will then read a preselected register in the Data Select Register 218 across the Data Select Bus 220. This preselected register contains a default Clock Signal and Sync Signal selection code. This code is outputted to the Driver 222, and becomes the Selection Signals 98 shown in FIG. 2, which causes the Selection Circuitry 92 to select a Clock Signal and a Sync Signal to become the System Clock 94 and the System Sync 96 signals.

The Data Select Register 218 contains multiple registers which have been prioritized so as to allow selection of the next register's selection code upon detection of a Clock A Fail 40, Clock B Fail 42, Clock C Fail 86, or Clock D Fail 88. Therefore, if Clock Signal A 16 and Sync Signal A 50 were the currently selected signals being selected by the Selection Circuitry 92 and Clock Source A 10 were to fail causing a loss of Clock Signal A and Sync Signal A, the Microprocessor 214 would recognize a high logic level at the Clock A Fail 40 input, and would select a different selection code from the Data Select Register 218. This in turn would send different Selection Signals 98 to the Selection Circuitry 92, and the corresponding new Clock Signal and Sync Signal would be selected as the System Clock 94 and System Sync 96. The Data Select Register 218 prioritization is preselected, and the order of priority can be chosen by preference of the programmer.

It should be recognized that it is not necessary to use the Microprocessor 214 to determine the Selection Signals 98, since other circuitry which can compare digital data would suffice, such as microcontrollers or discrete digital logic circuitry. It should also be recognized that the Selection Control Circuitry 90 may be programmed to select more than System Clock 94 and System Sync 96 signal. In the preferred embodiment, two System Clock 94 signals and two System Sync 96 signals are selected by the Selection Circuitry 92. The Selection Circuitry is merely a multiplexing unit known in the art, and the only adaptation necessary to select two System Clocks and two System Syncs is to use two multiplexers which are both selected by the same Selection Signals 98. The Clock Signals and Sync Signals are then coupled to one or the other multiplexing unit within the Selection Circuitry 92, and two sets of System Clocks and System Syncs can be selected.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters patents is set forth in the appended claims.

What is claimed is:

1. A clock signal failure detection and recovery circuit for use in a system utilizing three or more clock sources where each clock source includes an oscillator for furnishing a clock signal, comprising:

three or more pulse generating means, each coupled to a respective different one of the clock sources for receiving the respective clock signal and for producing in response thereto periodic clock pulses, and clock signal present pulses which periodically transition to an active logic level if said respective different one of the clock sources is operational; and three or more clock signal failure detection means, each coupled to an associated different one of said pulse generating means and coupled to other predetermined ones of said pulse generating means, for receiving said periodic clock pulses and said clock signal present pulses from each coupled pulse generating means and for generating a clock signal failure indication for said associated different one of said pulse generating means upon comparing said clock signal present pulses from said associated different one of said pulse generation means to said periodic clock pulses from said other predetermined ones of said pulse generating means and detecting discontinuance of said clock signal present pulses of said associated different one of said pulse generating means relative to said periodic clock pulses of said predetermined ones of said pulse generating means.

2. The clock signal failure detection and recovery circuit as in claim 1, wherein each of said periodic clock pulses has a triggering edge that occurs during the active logic level of said clock signal present pulses.

3. The clock signal failure detection and recovery circuit as in claim 1, wherein each said clock signal failure detection means includes a plurality of presence monitoring means, each for receiving said periodic clock pulses from a respective one of said predetermined ones of said pulse generating means to clock each said presence monitoring means, for monitoring said clock signal present pulses from said associated different one of said pulse generating means, and for providing a first timing signal indicative of a timing relationship between said periodic clock pulses from said respective one of said predetermined ones of said pulse generating means and said clock signal present pulses from said associated different one of said pulse generating means.

4. The clock signal failure detection circuit as in claim 3, wherein each of said presence monitoring means is for further receiving said clock signal present pulses from said respective one of said predetermined ones of said pulse generating means and for providing a second timing signal indicative of a timing relationship between said clock signal present pulses from said respective one of said predetermined ones of said pulse generating means and said periodic clock pulses from said associated different one of said pulse generating means.

5. The clock signal failure detection circuit as in claim 4, wherein said clock signal failure indication is generated upon activation of said first timing signal and said second timing signal.

6. The clock signal failure detection and recovery circuit as in claim 1, further comprising:
   clock signal selection control means, coupled to each of said clock signal failure detection means, for receiving said clock signal failure indications, and for generating in response thereto selection control signals; and
   clock signal selection means, coupled to each of said clock sources and to said clock signal selection control means, for receiving each of said clock signals and said selection control signals respectively, and for selecting operative ones of said clock signals in response to said selection control signals.

7. A clock signal failure detection circuit for detecting the loss of one of a plurality of clock signals, said clock signal failure detection circuit having a plurality of clock source circuits, wherein each clock source circuit generates an associated clock signal and associated periodic sync pulses having a predetermined timing relationship with the associated clock signal, the detection circuit comprising:
   three or more pulse generation circuits, wherein each of said pulse generation circuits is coupled to a respective different one of the clock source circuits to receive the associated clock signal and associated periodic sync pulses and wherein each of said pulse generation circuit further has a first output terminal to supply periodic clock pulses, and a second output terminal to supply clock signal present pulses;
   three or more clock signal failure detection circuits, each of said clock signal failure detection circuit having a plurality of third input terminals, wherein predetermined ones of said third input terminals are coupled to predetermined ones of said pulse generation circuits to receive corresponding ones of said periodic clock pulses, wherein other predetermined ones of said third input terminals are coupled to predetermined ones of said clock signal present pulses.

8. The clock signal failure detection and recovery circuit as in claim 7, wherein triggering edges of said periodic clock pulses occur during the active logic level of said clock signal present pulses.

9. The clock signal failure detection and recovery circuit as in claim 7, wherein each said clock signal failure detection circuit further comprises:
   a plurality of error latch circuits, each coupled to three of said third input terminals to receive clock signal present pulses from one of said pulse generation circuits, and to receive periodic clock pulses from a different one of said pulse generation circuits to enable an associated one of said error latch circuits, and further to receive a reset signal for resetting said associated error latch circuit, and having an error latch output to output a latched presence signal;
   a first presence signal comparing circuit coupled to said error latch circuits to receive said latched presence signals and compare pairs of said latched presence signals, and having first comparing circuit outputs to output equivalence signals indicating whether both of said latched presence signals in a pair are at the same logic state; and
   a second presence signal comparing circuit coupled to said comparing circuit outputs of said first presence signal comparing circuit to receive said equivalence signals and determine whether all of said equivalence signals are at a predetermined logic state, and having a second comparing circuit output coupled to said second output terminal to supply said clock signal failure indications.

10. A method of detecting the loss of one or more clock signals in a system utilizing multiple clock signals comprising the steps of:
   generating a periodic sync pulse from each of the clock signals such that said periodic sync pulse recurs on predetermined multiples of pulses of the clock signals;
   respectively generating a clock signal present pulse and a periodic clock pulse from the multiple clock signals, said periodic clock pulse having an active state and an inactive state;
   respectively latching each of said clock signal present pulses, wherein latching of a clock signal present pulse is enabled by a periodic clock pulse, and the clock signal from which a latched clock signal present pulse was generated is other than the clock signal from which an enabling periodic clock pulse was generated;
   comparing a plurality of predetermined pairs of said latched clock signal present pulses, and for each one of said plurality of predetermined pairs, determining whether each one of said latched clock signal present pulses in said one of the plurality of predetermined pairs was at the same effective logic level at the time of the occurrence of the active state of the associated one of said periodic clock pulse, and if not, generating a miscompare signal; and
   generating an error signal for each of the clock signals upon the occurrence of a predetermined number of said miscompare signals.

11. The method as defined by claim 10, further comprising the steps of:
   generating selection signals in response to error signals that indicate which clock signals have failed, wherein said selection signals are for selecting operative ones of the clock signals; and
   selecting operative ones of the clock signals and said periodic sync pulses in response to said selection signals.

12. A clock signal failure detection and recovery circuit for detecting the loss of one of a plurality of clock signals, wherein each one of the plurality of clock signals is generated by a different associated one of a plurality of clock source circuits, the detection and recovery circuit comprising:
   three or more pulse generation circuits, wherein each of said pulse generation circuits is coupled to a respective one of the clock source circuits to receive a clock signal, and outputs clock signal availability pulses;

three or more clock signal failure detection circuits, wherein each of said clock signal failure detection circuits is coupled to a respective one of said pulse generation circuits and coupled to at least two other predetermined ones of said pulse generation circuits to receive corresponding ones of said clock signal availability pulses, and each of said clock signal failure detection circuits outputs a clock signal failure indication for said respective one of said pulse generation circuits;

clock signal selection control circuitry coupled to said clock signal failure detection circuits to receive said clock signal failure indications, and having a selection control output to output selection control signals in response to said clock signal failure indications; and multiplexing circuitry coupled to each of the clock source circuits to receive each of the clock signals, and coupled to said clock signal selection control circuitry to receive said selection control signals and select specified ones of the clock signals in response to said selection control signals.

13. A clock signal failure detection and recovery circuit for use in a system utilizing three or more clock sources where each clock source includes an oscillator for furnishing a clock signal, comprising:

three or more pulse generating means, each coupled to a respective different one of the clock sources for receiving the respective clock signal and for producing in response thereto a periodic clock pulse and a clock signal present pulse which periodically transitions to an active logic level during the time the respective clock signal is operational; and three or more clock signal failure detection means, each coupled to an associated different one of said pulse generating means and coupled to other predetermined ones of said pulse generating means for receiving respective ones of said periodic clock pulses and clock signal present pulses and for detecting and indicating failure of the clock source of said associated different one of said pulse generating means, each clock signal failure detection means further including means for comparing said clock signal present pulse of said associated different one of said pulse generating means to said periodic clock pulses from said other predetermined ones of said pulse generating means and comparing said clock signal present pulses of said other predetermined ones of said pulse generating means to said periodic clock pulse of said associated different one of said pulse generating means to detect failure of the clock source of said associated different one of said pulse generating means.

14. A clock signal failure detection circuit for detecting the loss of one of a plurality of clock signals, wherein each one of the plurality of clock signals is generated by a different associated one of a plurality of clock source circuits, wherein each clock source circuit also generates a periodic sync signal and an inverted clock signal from the clock signal, and wherein the periodic sync signal has a predetermined timing relationship with the clock signal, the detection circuit comprising:

three or more pulse generation circuits, wherein each of said pulse generation circuits includes a shift register having an input terminal to receive a respective different one of the periodic sync signals, said shift register having a plurality of stages wherein each of said stages is coupled to one or more other stages, predetermined ones of said stages having a clock input terminal for receiving a respective different one of the clock signals and other predetermined ones of said stages having a clock input terminal for receiving a respective different one of the inverted clock signals, each said stage further having an output terminal to provide a shifted sync signal, and wherein each of said pulse generation circuits further includes combinational logic coupled to predetermined ones of said shifted sync signals to generate clock signal availability pulses; and three or more clock signal failure detection circuits, each having a plurality of third input terminals coupled to predetermined ones of said pulse generation circuits to receive corresponding ones of said clock signal availability pulses, and having second output terminals to supply clock signal failure indications in response to said corresponding ones of the clock signal availability pulses.

15. A clock signal failure detection and recovery circuit for detecting the loss of one of a plurality of clock signals generated by an equal number of clock source circuits, wherein each clock source circuit also generates a periodic sync pulse from the clock signal, and wherein the periodic sync pulse recurs on predetermined multiples of clock signal pulses, the detection and recovery circuit comprising:

three or more pulse generation circuits, each having a first and second input terminal, wherein each of said pulse generation circuits is coupled to a respective different one of the clock source circuits to receive a clock signal and periodic sync signal and has an output terminal to supply clock signal availability pulses; and three or more clock signal failure detection circuits, each having a plurality of third input terminals coupled to predetermined ones of said pulse generation circuits to receive corresponding ones of said clock signal availability pulses, and having second output terminals to supply clock signal failure indications in response to said clock signal availability pulses;

clock signal selection control circuitry coupled to said clock signal failure detection circuits to receive said clock signal failure indications, and having a selection control output to provide selection control signals in response to said clock signal failure indications; and multiplexing circuitry coupled to each of the clock source circuits to receive each of the clock signals and periodic sync pulses, and coupled to said clock signal selection control circuitry to receive said selection control signals and select specified ones of the clock signals in response to said selection control signals.

16. For use in a system having a plurality of clock source circuits, each clock source circuit for generating a clock signal, a clock signal failure detection circuit for detecting the loss of one of the clock signals, comprising:

three or more pulse generation circuits, wherein each of said pulse generation circuits is coupled to a respective one of the clock source circuits to receive a clock signal, and wherein each of said pulse generation circuits provides clock signal availability pulses;

three or more comparison circuits, each of said comparison circuits coupled to a respective one of said pulse generation circuits and further coupled to at least two other predetermined ones of said pulse generation circuits to receive corresponding ones of said clock signal availability pulses, whereby said clock signal availability pulse of said respective one of said pulse generation circuits is compared to said clock signal availability pulses of each of said predetermined ones of said pulse generation circuits, and clock signal availability pulses of each of said predetermined ones of said pulse generation circuits are compared one to another;

three or more voting circuits, each of said voting circuits having an input coupled to an associated one of said comparison circuits and an output for providing a clock signal failure indication for said respective one of said pulse generation circuits if a majority of said clock signal availability pulses of said predetermined ones of said pulse generation circuits favorably compare one to another and a minority of said clock signal availability pulses of said predetermined ones of said pulse generation circuits favorably compare to said clock signal availability pulses of said respective one of said pulse generation circuits.

* * * * *